United States Patent [19]

Büchler et al.

[11] Patent Number: 5,412,634
[45] Date of Patent: May 2, 1995

[54] OPTICAL SCANNING DEVICE FOR A DISC PLAYER INCLUDING IMPROVED FOCUSING APPARATUS

[75] Inventors: Christian Büchler, Marbach, Germany; Yasuaki Morimoto, Sakura, Japan

[73] Assignee: Deutsche Thomson-Brandt GmbH, Villegen-Schwenningen, Germany

[21] Appl. No.: 218,446

[22] Filed: Mar. 28, 1994

Related U.S. Application Data

[63] Continuation of Ser. No. 946,059, Sep. 18, 1992, abandoned.

[30] Foreign Application Priority Data

Feb. 16, 1990 [DE] Germany ............... 40 04 858.6

[51] Int. Cl.[6] .................................................. G11B 7/00
[52] U.S. Cl. ......................... 369/44.23; 250/201.5
[58] Field of Search ............... 369/44.23, 44.37, 44.32, 369/112; 250/201.5, 201.2, 201.4

[56] References Cited

U.S. PATENT DOCUMENTS

| | | | |
|---|---|---|---|
| 4,011,400 | 3/1977 | Simons et al. | 369/44.23 |
| 4,293,944 | 10/1981 | Izumita et al. | 369/44.23 |
| 4,767,921 | 8/1988 | Kawasaki et al. | 369/44.23 |
| 4,815,060 | 3/1989 | Nomura | 369/44.23 |

FOREIGN PATENT DOCUMENTS

| | | | |
|---|---|---|---|
| 0107461 | 10/1983 | European Pat. Off. | G11B 7/00 |
| 0316866 | 5/1989 | European Pat. Off. | G11B 7/09 |
| 2026211 | 1/1980 | United Kingdom | G11B 7/08 |

OTHER PUBLICATIONS

Patent Abstract of Japan 58-1460333, Aug. 31, 1983, 9, p. 239.
Patent Abstract of Japan 58-146034, Aug. 31, 1983, 9, p. 239.

*Primary Examiner*—Georgia Y. Epps
*Assistant Examiner*—P. W. Huber
*Attorney, Agent, or Firm*—Joseph S. Tripoli

[57] ABSTRACT

A scanning device for recording/reading data in data tracks of a recording medium includes a light source supported by a tracking head for guiding a light beam along the data tracks. The data tracks are rotated and the beam is focussed onto the data tracks. The light source is moved at an angle α with respect to the radial direction of motion of the data tracks. An optical element directs the light beam to the recording medium and directs light reflected from the recording medium to a detector. An astimatic element is arranged between the optical element and the detector. The scanning device is improved in that the astimatic element has one axis arranged at the angle α with respect to the radial direction of motion.

2 Claims, 5 Drawing Sheets $$FE = (AS + CS) - (BS + DS) = 0$$

$$FE = (AS + CS) - (BS + DS) < 0$$

$$FE = (AS + CS) - (BS + DS) > 0$$

OPTICAL SCANNING DEVICE FOR A DISC PLAYER INCLUDING IMPROVED FOCUSING APPARATUS

This is a continuation of application Ser. No. 07/946,059, filed Sep. 18, 1992, now abandoned, which is a continuation of PCT application PCT/EP91/00226 filed Feb. 6, 1991 by Christian Buchler and Yasuaki Morimoto and titled "Optical Scanning Device".

This invention is directed to an optical scanning device for a recording/playback mechanism. A light beam is focused onto a record recording medium by an object lens according to the single beam technique. The beam is reflected from the recording medium onto a photodetector. The light beam and photodetector are guided along the data tracks of the recording medium by a tracking regulation circuit. The driving mechanism includes a coarse drive and a fine drive mechanically coupled to the coarse drive. The object lens can be moved by the fine drive in a direction which is set at a predetermined angle $\alpha$ with respect to the normals to the direction of the track. An astigmatic element is provided in the path of the light beam as the light beam is reflected from the recording medium onto the photodetector. An optical scanning device of this type is described in German application P 39 01 547.2.

The light beam emitted from a laser diode is focused onto the recording medium, for example a compact disc, by an object lens and is reflected from the disc onto a four-quadrant photodetector consisting of four photodiodes A, B, C and D. An astigmatic element, for example a cylindrical lens, is placed in the path of the reflected beam. The projection of the light beam L onto the detector is circular when the beam is accurately focused onto the square photodetector and is elliptical when the beam is defocussed.

FIG. 1a shows the light beam L when focusing is precise. The light spot formed by the laser beam L on the photodetector is circular in shape, the focusing error signal $FE = (AS + CS) - (BS + DS) = 0$. The value of zero for the focusing error signal FE is recognized by the focusing regulation circuit as a precise focussing, and no focussing changes are made.

FIG. 1b shows the result of defocussing when the disc is too far away from the object lens. The focussing error signal FE is negative, i.e. $FE = -(AS + CS) - (BS + DS) < 0$. A negative value for the focussing error signal FE is recognized by the focussing regulation circuit as an indication that the distance between disc and object lens is too large. Therefore, the object lens is moved by the actuator of the focusing regulation circuit towards the disc until the focusing error signal FE becomes zero.

FIG. 1c shows the result of defocussing when the object lens is too near the compact disc. The focussing error FE signal has a positive value, i.e. $FE = -(AS + CS) - (BS + DS) > 0$. A positive value for the focussing error signal FE is recognized by the focussing regulation circuit as meaning that the object lens is too near the disc. Therefore, the objective lens is moved by the actuator of the focussing regulation circuit away from the disc until the focussing error signal FE becomes zero.

Three data tracks S of the disc, which has pits P written on it, are shown in FIG. 2a and 2b. The direction of rotation of the disc is indicated by the arrow designated T. Because the object lens is moved by the fine drive in a direction which makes an angle $\alpha$ relative to the radial direction, the light beam L on the disc also travels at the angle $\alpha$. One axis of the four-quadrant photodetector, hereinafter referred to as the y-axis, runs in a tangential direction with respect to the data tracks. The other axis of the four-quadrant photodetector which is perpendicular to the y-axis and which is parallel to the radial direction, is hereinafter designated the x-axis.

The fine drive moves the object lens in the specified direction W, which is at the angle $\alpha$ relative to the radial motion direction, so that the light beam follows the data track, then the spot of light L on the four-quadrant photodetector travels a straight line W which also is at the angle $\alpha$ with respect to the x-axis. By moving the object lens in the direction specified, however, imaging defects of the light beam on the four-quadrant photodetector are caused which adulterate the focussing error signal FE. Therefore, the light beam can no longer be accurately focussed onto the recording medium.

It is, therefore, an object of the invention to minimize focussing errors caused by imaging defects. The invention achieves this objective in that a selected axis of an astigmatic element which is placed in the path of the beam also makes the angle $\alpha$ relative to the normals of the direction of the data tracks.

Figure 1A:
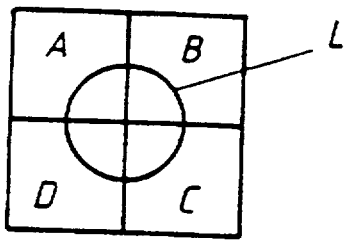
FIGS. 1a, 1b and 1c show the light spot on the photodetector.
Figure 1B:
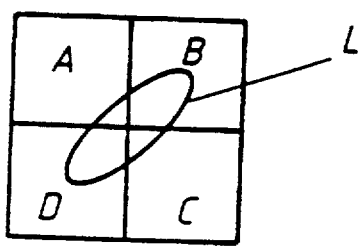
Figure 1C:
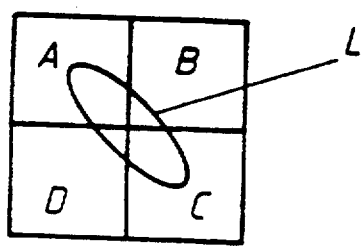
Figures 2A, 2B:
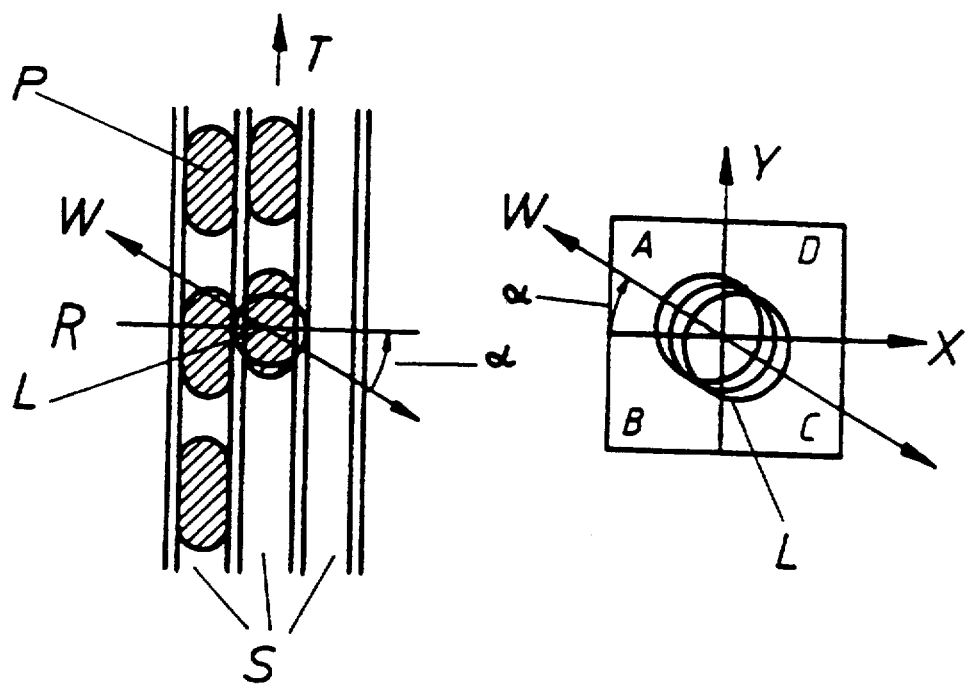
FIGS. 2a and 2b shows the motion vectors of the light spot on the recording medium and the photodetector.
Figure 3:
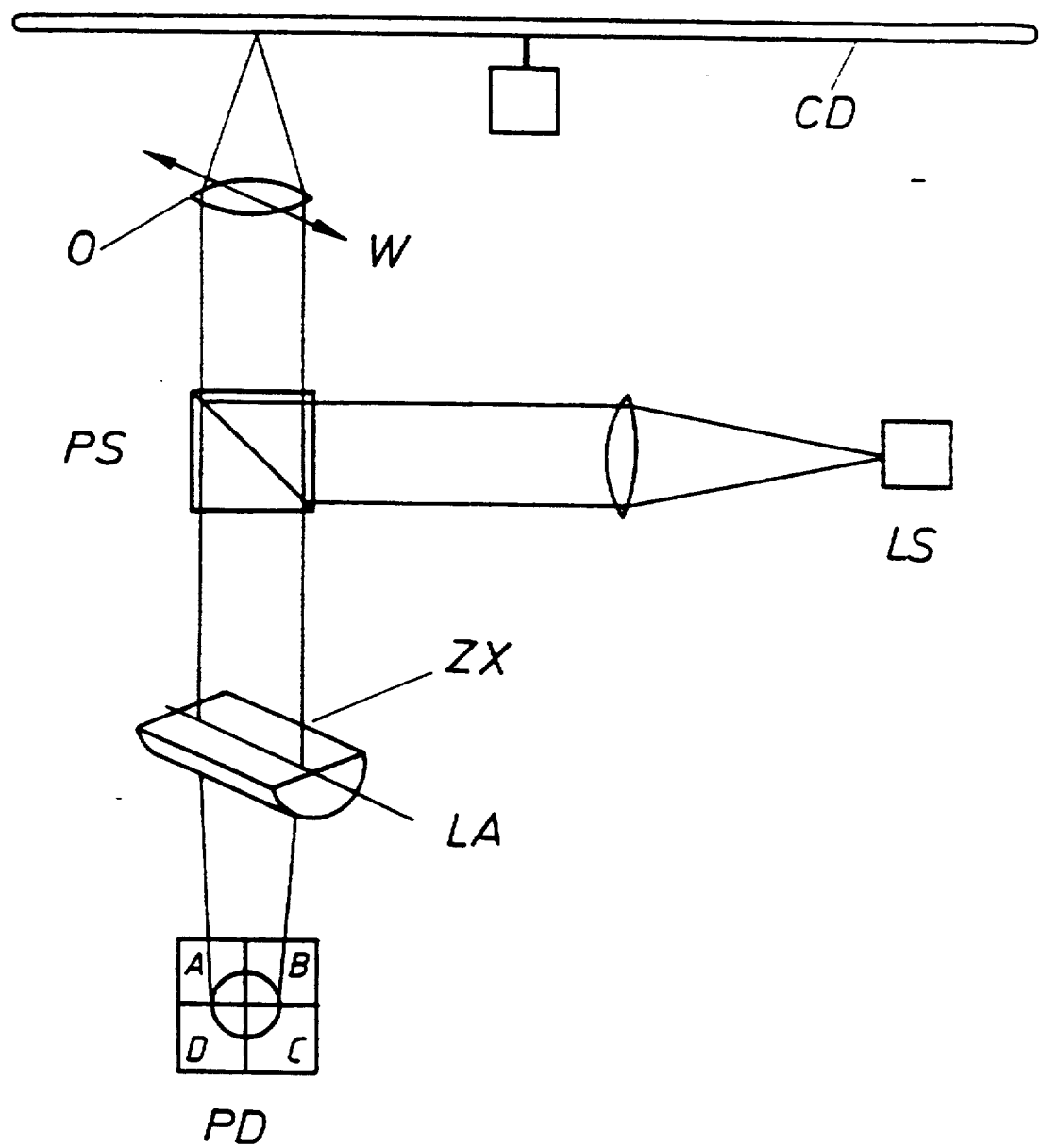
FIG. 3 is a first preferred embodiment.

In the FIG. 3 embodiment, a convex cylindrical lens ZX is provided as an astigmatic element. The light beam emitted from the laser diode LS is directed onto the recording medium (a disc CD) by a prismatic beam splitter PS. The light is reflected from the disc and radiates through the prismatic beam splitter PS and the convex cylindrical lens onto the four-quadrant photodetector PD. The convex cylindrical lens ZX is arranged in the path of the beam and between the object lens O and the four-quadrant photodetector PD such that the longitudinal axis LA of the lens ZX is parallel to the direction of movement W of the object lens O. The convex side of the cylindrical lens ZX can face either the disc CD or the four-quadrant photodetector PD. Although imaging defects are present they do not adversely affect the focussing error signal FE to any significant extent because of their symmetry with respect to the direction W.

Figure 4:
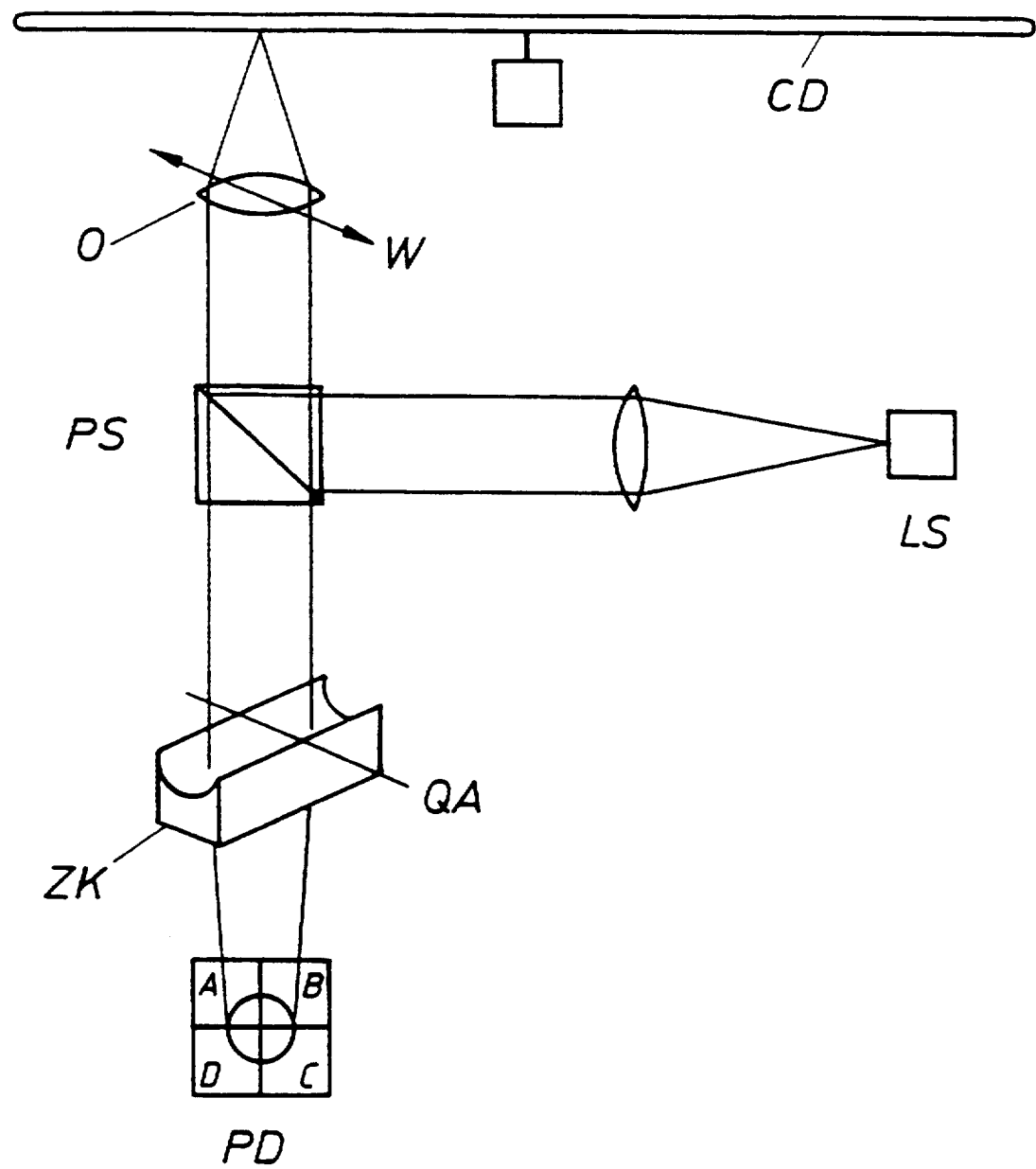
FIG. 4 is a second preferred embodiment.

In the FIG. 4 embodiment, a concave cylindrical lens ZK is placed in the path of the beam between the object lens O and the four-quadrant photodetector PD and serves as the astigmatic element. In order to insure that the imaging defects do not have a disturbing effect on the focussing, the concave cylindrical lens ZK is arranged in the path of the beam such that its transverse (perpendicular) axis QA runs parallel to the direction of movement W of the object lens. It does not matter whether the concave side of the cylindrical lens ZK faces the disc CD or the four-quadrant photodetector PD.

Figure 5:
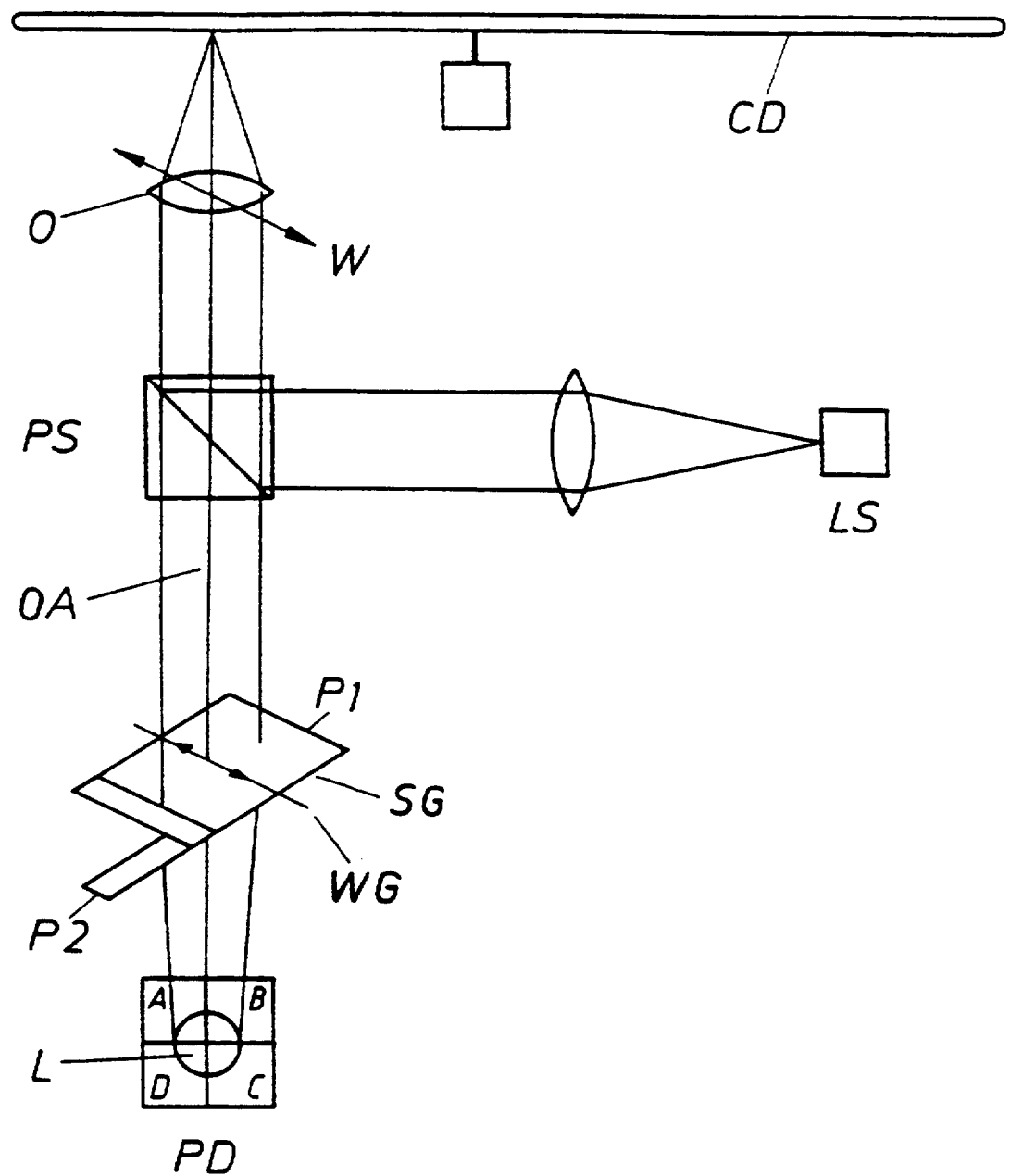
FIG. 5 is a third preferred embodiment of the invention.

The FIG. 5 embodiment includes two plates P1 and P2 which are arranged at an angle $\gamma$, preferrably 90°, with respect to one another, and which are made from transparent material in order to generate astigmatism. One plate P1 intersects the optical axis OA at an angle of +45 degrees. The other plate P2 is perpendicular to plate P1 and intersects the optical axis OA at an angle of −45 degrees. Also, the two plates P1 and P2 are arranged such that the plane in which the intersection SG of the two plates P1 and P2 lies is perpendicular to the direction of motion W of the object lens O. The side edges of the two plates P1 and P2, are, therefore, parallel to the direction of motion W of the object lens O when the plates P1 and P2 are rectangular. When the object lens O is moved by the fine drive in the direction W, the light beam traces a straight line WG on the two plates P1 and P2. The line WG is perpendicular to the intersection SG of plates P1 and P2 and is parallel to the direction of movement W and to the side edges of plates P1 and P2.

The angle between plates P1 and P2 can be different from 90 degrees. However, in order to assure a clearly measurable astigmatic effect, the angle must exceed 0 degrees and be less than 180 degrees by certain amounts which are determined by the optical characteristics of the material from which the plates are made. The two plates P1 and P2 are arranged in the path of the light beam such that the plane of the bisector of the angle between the plates is perpendicular to the optical axis OA. The two plates P1 and P2 can be two separate parts appropriately arranged in the path of the light beam. The plates can also be joined to one another to form a single part. For example, one edge of plate P2 can be permanently affixed to an edge of plate P1.

The invention is suitable for optical scanning devices which focus a light beam onto the recording medium by means of an object lens, and using the astigmatism technique to read the data from the recording medium. The object lens is moveable in a direction which makes a predetermined angle $\alpha$ with respect to the normals of the track direction. The invention can be used in CD players, video disc players, DRAW disc players and magnetooptical players, for example.

We claim:

1. A scanning device for reading data in the data tracks of a recording medium, said scanning device including:

a light source supported by a tracking head for guiding a light beam along said data tracks;

means for rotating said recording medium;

means for focusing said beam onto said data tracks;

means for moving said light beam radially across said data tracks and in a direction which is at an acute angle a with respect to a line normal to a longitudinal direction of said data tracks;

means including a four quadrant detector in which respective detectors are separated by orthogonal axes, and one of said orthogonal axes is aligned parallel with a longitudinal direction of said data tracks, said means including a four quadrant detector, providing a control signal for controlling said means for focusing said beam;

means for directing said light beam to said recording medium and for directing light reflected from said recording medium to said four quadrant detector; and a convex cylindrical lens arranged between said means for directing and said four quadrant detector, said convex cylindrical lens having a longitudinal axis arranged at said acute angle a with respect to said line normal to a longitudinal direction of said data tracks.

2. A scanning device for reading data in the data tracks of a recording medium, said scanning device including:

a light source supported by a tracking head for guiding a light beam along said data tracks;

means for rotating said recording medium;

means for focusing said beam onto said data tracks;

means for moving said light beam radially across said data tracks and in a direction which is at an acute angle a with respect to a line normal to a longitudinal direction of said data tracks;

means including a four quadrant detector in which respective detectors are separated by orthogonal axes, and one of said orthogonal axes is aligned parallel with a longitudinal direction of said data tracks, said means including a four quadrant detector, providing a control signal for controlling said means for focusing said beam;

means for directing said light beam to said recording medium and for directing light reflected from said recording medium to said four quadrant detector; and a concave cylindrical lens arranged between said means for directing and said four quadrant detector, said concave cylindrical lens having a longitudinal axis arranged at said acute angle a with respect to said longitudinal direction of said data tracks.

* * * * *